June 27, 1944. C. HOLLERITH 2,352,385
WHEEL AND BRAKE STRUCTURE
Filed Sept. 22, 1941 2 Sheets-Sheet 1

Inventor
CHARLES HOLLERITH
By Bearman & Langford
Attorneys

June 27, 1944. C. HOLLERITH 2,352,385
WHEEL AND BRAKE STRUCTURE
Filed Sept. 22, 1941 2 Sheets-Sheet 2

Inventor
CHARLES HOLLERITH
By Beaman & Langford
Attorneys

Patented June 27, 1944

2,352,385

UNITED STATES PATENT OFFICE 2,352,385

WHEEL AND BRAKE STRUCTURE

Charles Hollerith, Jackson, Mich., assignor to Hayes Industries, Inc., Jackson, Mich., a corporation of Michigan Application September 22, 1941, Serial No. 411,781

3 Claims. (Cl. 188—2)

The present invention relates to wheels, and more particularly to wheels for beaching gear for beaching hydroplanes.

Hydroplanes are commonly beached by placing the same on beaching gear. The wheels of the beaching gear are provided with brakes primarily for lowering planes thereon down the ramp to the water. According to the present invention, the brake drum is employed as a part of the housing for the brake structure to keep water therefrom.

An object of the present invention is to make a housing for wheel brake structure employing the brake drum as a part of the housing.

Another object of the invention is to provide a housing for wheel brake structure having a cover plate disposed in sealing and telescopic relation with the brake drum.

A further object of the invention is to seal the interior of a wheel having a brake structure with a cover slidably disposed within the brake drum.

A further object of the invention is to provide means for discharging water from wheel brake cavities.

Figure 1:
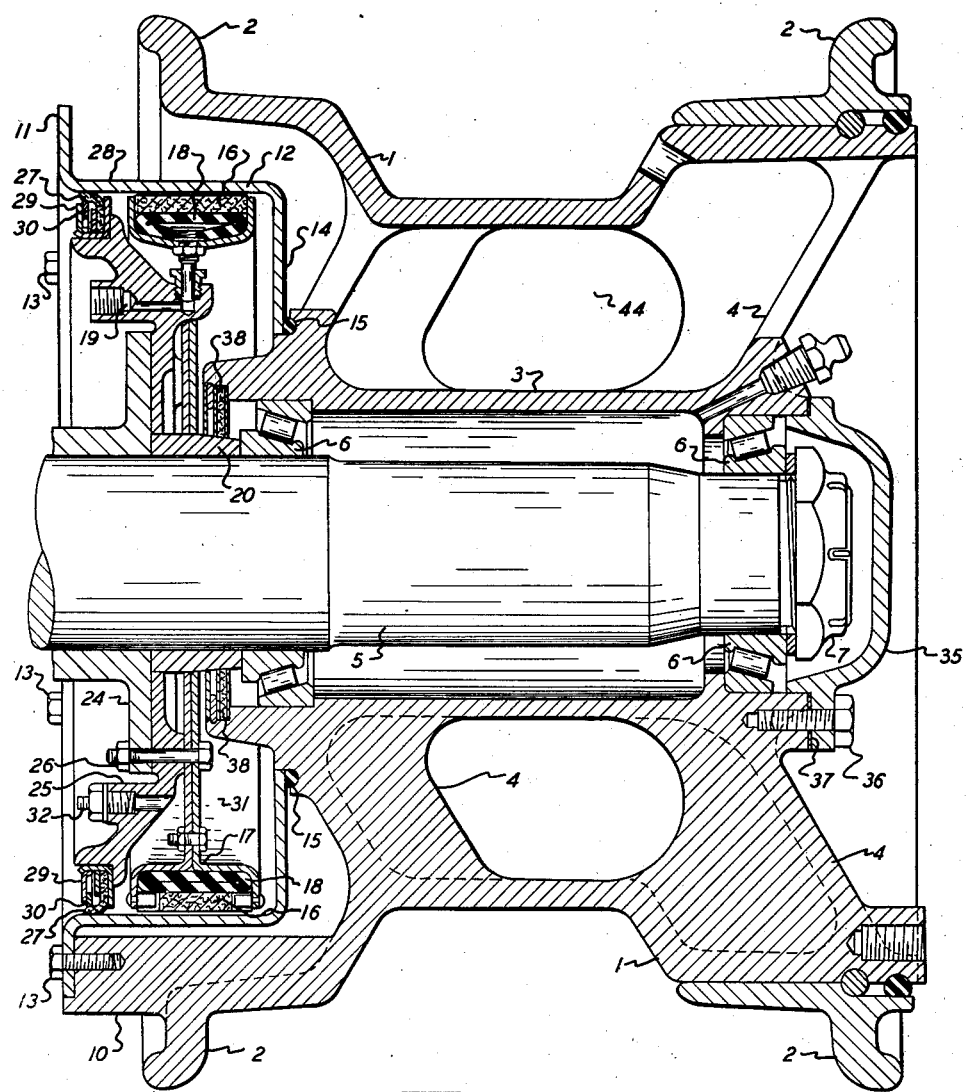
Figure 2:
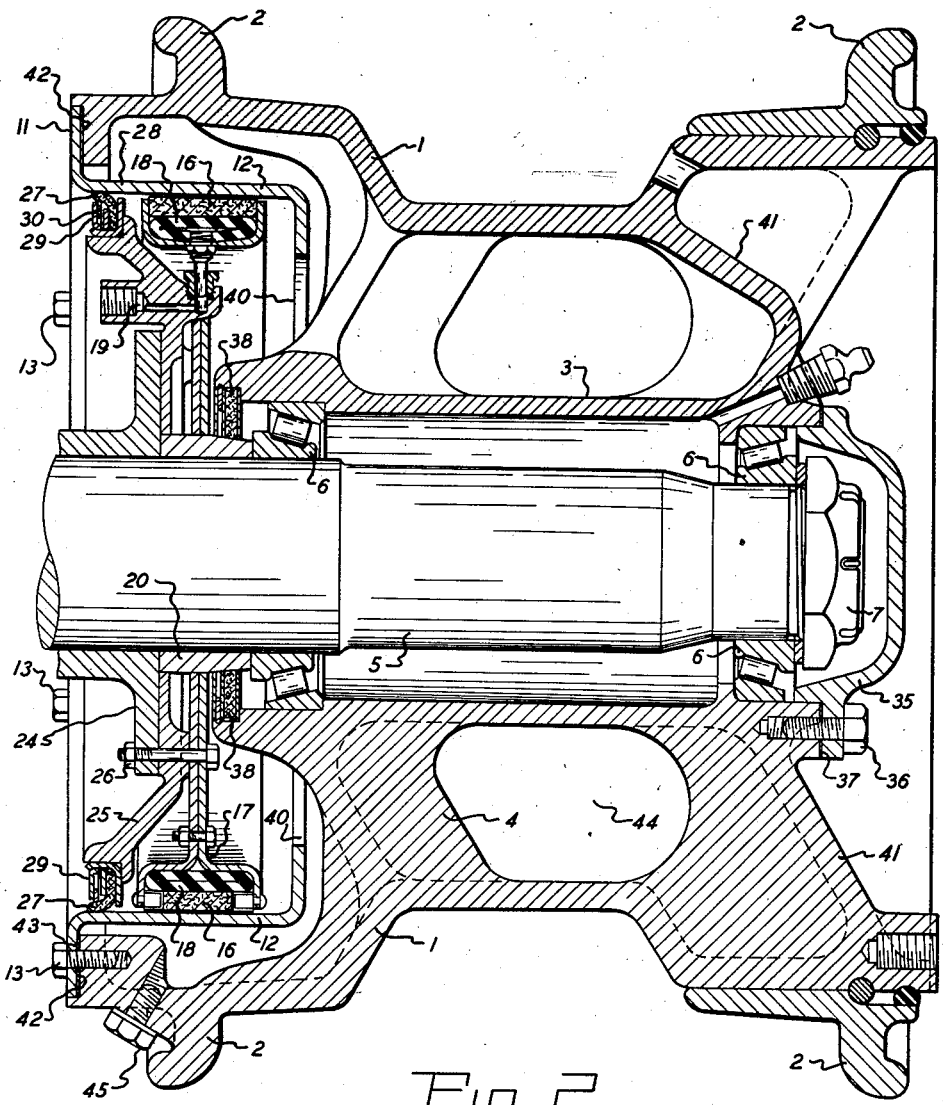

These and other objects residing in the arrangement, combination and construction of the parts will be apparent from the following specification when taken with the accompanying drawings, in which Fig. 1 is a vertical section of a wheel according to the present invention disclosing one form of the invention, and Fig. 2 is a view corresponding to Fig. 1 disclosing another form of the invention.

Referring particularly to Fig. 1, the reference character 1 indicates a wheel body provided with a tire supporting rim 2, a hub 3, and rim supporting webs 4. The wheel is mounted on an axle 5 from which it is supported by bearings 6. A nut 7 threaded on to the outer end of the axle 5 maintains the wheel 1 on the axle 5.

The inner face of the wheel body 1 is provided with a plurality of axially extending bosses 10, one of which is shown, to which is secured, by screws 13, the radially outwardly extending flange 11 of the brake drum 12. The inside end of the brake drum 12 is provided with a radially inwardly extending flange 14, bearing against a rubber or the like bead 15, seated in the body 1, for providing a water seal.

Arranged within the brake drum 12 for operative engagement therewith are brake blocks or a brake lining 16 supported by a bracket 17, having therein a hydraulic flexible tube 18 provided with a hydraulic fluid connection 19 for urging the lining 16 into engagement with the brake drum 12. The brake may be of the character disclosed in my copending application Serial No. 275,355 filed May 24, 1939. The portion of the bracket 17 adjacent the axle 5 is press fitted on a sleeve 20. The sleeve 20 is concentrically arranged on the axle 5 and fits therein sufficiently closely to provide a water seal between it and the axle 5.

On the outside of the bracket 17 is disposed a cover plate 25, preferably press fitted on and in sealing relation with the sleeve 20. The bracket 17 and cover plate 25 are clamped together and to a supporting flange 24 by bolts 26, the supporting flange 24 being fixed to the beaching gear, not shown. At the periphery of the cover plate 25, there is provided a sealing member 27 of leather or the like, which is substantially L-shaped in cross section and has the annular foot thereof extending at an angle to an outward, cylindrical, integral extension 28 of the brake drum 12. The sealing member 27 is secured by a clip structure 29 to the cover plate 25 and the foot thereof is urged resiliently outwardly into frictional engagement with the extension 28 of the brake drum 12 by a spring ring 30. It will be observed that the brake drum 12, the cover plate 25, and a portion of the body 1 provide a chamber 31 housing the brake bracket 17 and associated brake structure. An air connection 32 is provided in the cover plate 25 communicating with the chamber 31 for the purpose of blowing out any water that may have accidentally leaked into the chamber 31. The air connection 32 may be provided with a spring pressed valve to prevent entrance of water therethrough. It will appear from Fig. 1 that the angular relation of the foot of the sealing member 27 to the extension 28 facilitates the blowing out of water from the chamber 31.

At the outer end of the body 1, the hub opening is closed by a hub cap 35, which is secured to the wheel 1 by screws 36. A gasket 37 is disposed between the cap 35 and the wheel 1 so as to provide a water-tight seal, preventing the entrance of water into the interior of the hub portion of the wheel and into the brake chamber 31. A grease seal 38 of conventional design is disposed between the body 1 and the sleeve 20.

The brake is operated by admitting hydraulic fluid under pressure through the connection 19 to the hydraulic tube 18 to urge the brake lining 16 into frictional engagement with the brake drum 12, to restrain the rotation of the wheel 1.

One of the particular advantages of the invention is that the seal, provided by the sealing member 27 of the cover plate 25 in engagement with the brake drum 12 extension 28, is automatically opened and closed upon the removing of the wheel from the axle 5 and placing it on the axle 5 again, without any other operation than to remove the nut 7 on the end of the axle 5 for permitting the removal of the wheel.

Another form of the invention is disclosed in Fig. 2. In this form of the invention the parts are the same as in Fig. 1, and have like reference characters applied thereto except as herein stated. The brake drum 12 does not have the radially inwardly extending flange 14 disclosed in Fig. 1, but has instead a radially inwardly extending flange 40 which is not in sealing relation with the body 1, but stops short thereof. Also in Fig. 2, the body 1 is provided at the outside thereof with webs 41 between the hub 3 and rim 2 which have no opening to the interior of the body 1. The flange 11 of the brake drum 12 seats against an annular seat 42 having a gasket 43 thereon. The result is that the brake drum 12 and cover plate 25 provide with the body 1 a large chamber 44, which not only is sealed from the entrance of water and encloses the brake bracket 17 and its associated braking structure, but also provides a relatively large inner chamber for floating the wheel while in water or at least making it more buoyant than the form of the invention disclosed in Fig. 1, wherein the corresponding chamber 31 is relatively small and does not have sufficient volume to substantially affect the buoyancy of the wheel as a whole.

In Fig. 2 there is disclosed a drain plug 45 communicating with the chamber 44. The drain plug 45 is for the purpose of draining off any water that may accidentally enter the chamber 44 and may be used with or without an air connection 32, such as is disclosed in Fig. 1.

It will be observed from Figs. 1 and 2 that there is a definite similarity between the constructions of Figs. 1 and 2. In both constructions the cover 25 is in frictional engagement with the cylindrical extension 28 of the brake drum 12, thus permitting removal and replacement of the wheel without additional manipulation to separate and remake the seal between the cover 25 and the brake drum 12. Also, in both constructions, a portion of the brake drum comprises a portion of the wall of the internal chamber. Thus in Fig. 1 a relatively large portion of the brake drum comprises a portion of the wall of the chamber 31, the portion consisting of the entire friction surface of the brake drum 12 plus the radially extending flange 14 thereof. In the construction of Fig. 2 a much smaller portion of the brake drum 12 comprises a portion of the wall of the chamber 44, the portion being that between the line of engagement of the sealing member 27 with the brake drum extension 28, and the inner line of engagement of the flange 11 with the seat 42. It will be noticed that in the construction of Fig. 1 the inside of the brake drum comprises a portion of the inside of the chamber 31, whereas in Fig. 2 only the outside of the brake drum 12 may comprise a portion of the chamber 44. It will be observed that the outside area of the brake drum 12 which comprises a portion of the chamber 44 might be reduced to zero in the form of the invention shown, with only the thickness of the brake drum 12 comprising a portion of the wall of the chamber 44.

While the invention has been described particularly in association with a beaching wheel, it will be understood that the features of the invention may be equally well applied to other types of wheels if desired. Accordingly, it is not intended that the claims be limited to any particular type of wheel.

Having thus disclosed my invention, what I desire to secure by Letters Patent and claim is:

1. In a wheel of the character described, a body, a brake drum member therefor having an inside friction braking surface and provided with a radially inwardly extending flange at one edge, said brake drum member being provided with an extension at its opposite edge having an inner surface aligned with the friction braking surface and said extension having an angularly outwardly extending flange, means cooperating with one of said flanges and with the wheel body establishing a fluid sealed chamber within the brake drum, said brake drum and the extension thereof having a single uniform continuous internal diameter, brake means within the brake drum and cooperable with the internal friction braking surface thereof, a cover at the open side of said brake drum enclosingly covering the brake means and the friction surface therefor and having a peripheral portion disposed adjacent to the inner wall of the extension of the brake drum, and an annular sealing member carried by the peripheral portion of said cover and engaging with the inner surface of the extension of the brake drum.

2. In a wheel of the character described, a body, a brake drum member therefor having an inside friction braking surface and provided with a radially inwardly extending flange at one edge, said brake drum member being provided with an extension at its opposite edge having an inner surface aligned with the friction braking surface and said extension having an angularly outwardly extending flange, means cooperating with one of said flanges and with the wheel body establishing a fluid sealed chamber within the brake drum, said brake drum and the extension thereof having a single uniform continuous internal diameter, brake means within the brake drum and cooperable with the internal friction braking surface thereof, a cover at the open side of said brake drum enclosingly covering the brake means and the friction surface therefor and having a peripheral portion disposed adjacent to the inner wall of the extension of the brake drum, and an annular sealing member carried by the peripheral portion of said cover and engaging with the inner surface of the extension of the brake drum, said sealing member including an L-shaped yieldable packing ring having an annular foot thereof engaging with the inner surface of the extension of the brake drum in an annular plane substantially parallel with the plane of the friction surface and having said annular foot extending at an angle outwardly with respect to the brake means.

3. In a wheel of the character described, a body, a brake drum member therefor having an inside friction braking surface and provided with a radially inwardly extending flange at one edge, said brake drum member being provided with an extension at its opposite edge having an inner surface aligned with the friction braking surface and said extension having an angularly outwardly extending flange, means cooperating with one of said flanges and with the wheel body establishing a fluid sealed chamber within the brake drum, said brake drum and the extension thereof having a single uniform continuous internal diameter, brake means within the brake drum and cooperable with the internal friction braking surface thereof, a cover at the open side of said brake drum enclosingly covering the brake means and the friction surface therefor and having a peripheral portion disposed adjacent to the inner wall of the extension of the brake drum, an annular sealing member carried by the peripheral portion of said cover and engaging with the inner surface of the extension of the brake drum, said sealing member including an L-shaped yieldable packing ring having an annular foot thereof engaging with the inner surface of the extension of the brake drum in an annular plane substantially parallel with the plane of the friction surface and having said annular foot extending at an angle outwardly with respect to the brake means, and an air connection with the chamber thus provided within the brake drum for admitting air under pressure to said chamber for removing water and foreign matter from the braking surface and blowing the same in a direct path outwardly past the sealing member.

CHARLES HOLLERITH.